United States Patent [19]
Guest

[11] Patent Number: 6,086,044
[45] Date of Patent: Jul. 11, 2000

[54] TUBE COUPLINGS

[76] Inventor: John Derek Guest, 'Iona', Cannon Hill Way, Bray, Maidenhead, Berkshire SL6 2EX, United Kingdom

[21] Appl. No.: 09/209,392

[22] Filed: Dec. 10, 1998

[30] Foreign Application Priority Data

Feb. 27, 1998 [GB] United Kingdom .................... 9804329
Mar. 27, 1998 [GB] United Kingdom .................... 9806644

[51] Int. Cl.[7] .............................. F16L 51/00; F16L 21/06
[52] U.S. Cl. ........................ 251/149.9; 251/148; 285/323
[58] Field of Search ................................ 251/149.9, 148; 285/322, 323

[56] References Cited

U.S. PATENT DOCUMENTS

| | | | |
|---|---|---|---|
| 3,666,297 | 5/1972 | Marks | 285/323 |
| 4,606,783 | 8/1986 | Guest | 156/73.1 |
| 5,197,711 | 3/1993 | Geiger et al. | 251/148 |
| 5,390,969 | 2/1995 | Guest | 285/38 |
| 5,775,742 | 7/1998 | Guest | 285/323 |

*Primary Examiner*—Kevin Shaver
*Assistant Examiner*—David A. Bonderer
*Attorney, Agent, or Firm*—Baker & Daniels

[57] ABSTRACT

A tube coupling including a coupling body with a throughway having an open end to receive a tube. The diameter of the throughway increases towards the open end at a first location to form a first enlarged diameter portion to receive a tube. The diameter of the throughway also increases at a second location to form a further enlarged diameter portion to receive a tube locking device which holds the tube in the coupling body. A relatively hard plastics sleeve includes an end portion which is force-fit in the tube, and another end portion which includes an integral collar formed from a relatively soft plastics material including an annular sealing abutment. The annular sealing abutment sealingly engages in the throughway of the coupling body beyond the first location to prevent ingress of fluids between the sleeve and the throughway.

8 Claims, 8 Drawing Sheets

TUBE COUPLINGS

This application claims the benefit under Title 35, U.S.C. § 119 of United Kingdom patent application Ser. No. 9804329.2, filed Feb. 27, 1998, and United Kingdom patent application Ser. No. 9806644.2, filed Mar. 27, 1998.

BACKGROUND TO THE INVENTION

1. Field of the Invention

This invention relates to tube couplings in which a coupling body has an open ended throughway to receive an end of a tube with a locking device in the coupling body to engage and hold the tube in the body for flow of fluid between the tube and throughway in the body.

2. Background Prior Art

Such tube couplings are commonly used in apparatus for dispensing drinks such as carbonated drinks, beers and ciders. Any gaps or pockets however small provide areas where fluids can accumulate and deteriorate unless the apparatus is very effectively cleaned which is difficult in the case of very narrow pockets such as occur in tube couplings. Where fluids accumulate over a period of time bacterial action invariably occurs and the resulting fluids at the very least harm the taste of fresh fluids dispensed through the system and, more seriously, may create a significant health risk.

SUMMARY OF THE INVENTION

This invention provides a tube coupling comprising a coupling body having a throughway open at one end to receive a tube, the diameter of the throughway increasing towards said open end at a first location to form a first enlarged diameter portion to receive a tube and at a second location to form a second, further enlarged diameter portion to receive a tube locking device to hold a tube in the coupling body, and a relatively hard plastics sleeve one end portion of which is a force fit in a tube to be engaged in the coupling and the other end portion of which has an integral collar formed from a relatively soft plastics material with an integral upstanding annular sealing ring at the end of the sleeve to engage sealingly in the throughway of the coupling body beyond said first location to prevent ingress of fluids between the sleeve and throughway.

The sleeve may have an integral annular flange formed partway along the sleeve from said other end and the collar of soft plastics material may encircle the sleeve between the flange and said other end of the sleeve.

Preferably the collar is extruded on to the sleeve and is formed from a plastics material which self adheres to the plastics of the sleeve.

In any of the above arrangements, the portion of the sleeve to engage in the tube is formed with one or more integral annular barbs encircling the sleeve to engage in the tube and retain the sleeve in the tube so that when the tube moves slightly outwardly of the coupling body the portion of the sleeve projecting into the throughway is withdrawn by a corresponding amount, the sealed end of the tube remaining in sealing engagement with the throughway.

More specifically the sleeve may have two encircling barb shaped projections in spaced locations along the sleeve to engage the inner surface of the tube.

In any of the above arrangements the tube locking device may comprise a collet having an annular portion and a plurality of resilient fingers projecting into the coupling body and the coupling body has a tapered internal cam surface reducing it in diameter towards the open end with which the fingers of the collet are engageable to be compressed against the surface of the tube to lock the tube in the coupling body.

Also in any of the above arrangements the collar may be formed with an integral "ducks bill" shaped non-return valve projecting beyond the end of the sleeve.

DESCRIPTION OF THE PREFERRED EMBODIMENTS

Figure 1:
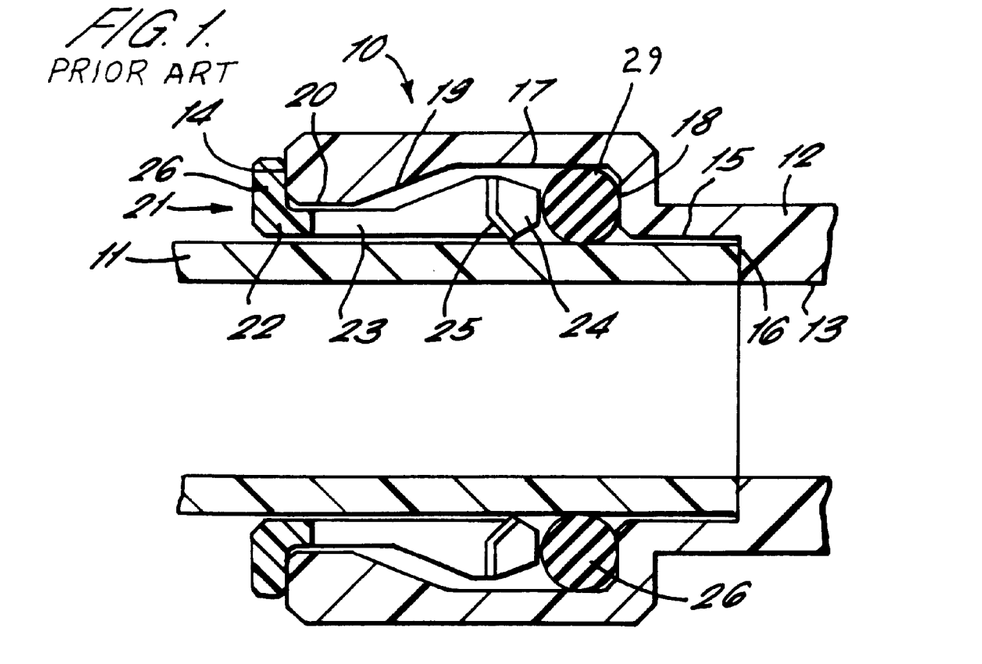
FIG. 1 is a sectional view through a known form of tube coupling having a collet and locking device with a tube fully inserted in the coupling prior to engagement of the locking device.

Referring firstly to FIG. 1 of the drawings, there is shown a tube coupling indicated generally at 10 for a tube 11. The coupling comprises a coupling body 12 through which a throughway 13 extends to an open end 14. Towards the open end, the throughway is formed with a first enlarged diameter portion 15 at a step 16 facing towards the open end of the coupling body and a second further enlarged diameter portion 17 at a second step 18 also facing towards the open end of the coupling body. The enlarged diameter portion 17 is formed with a tapered cam surface 19 reducing towards the open end of the coupling body and terminating in a short plain cylindrical entry 20 at the open end of the coupling body.

The enlarged diameter portion 17 of the coupling body contains a collet indicated at 21 for locking the tube 11 in the coupling body. The collet has an annular portion 22 formed with resilient fingers 23 projecting axially into the throughway and having heads 24 at their distal ends incorporating angled teeth 25 to grip and engage the tube. The collet is completed by an out turned head or flange 26 encircling the annular part of the collet which overlies the end 14 of the coupling body around the open end of the throughway.

A tube 11 to be locked in the coupling body is inserted into the coupling body through the collet into the first enlarged portion of the throughway 15 and the end of the tube is engaged with the step 16. An O-ring seal at 29 is mounted in the further enlarged portion of the throughway against the step 18 to seal between the throughway step and surface of the tube to prevent loss of fluid from the coupling body.

Figure 2:
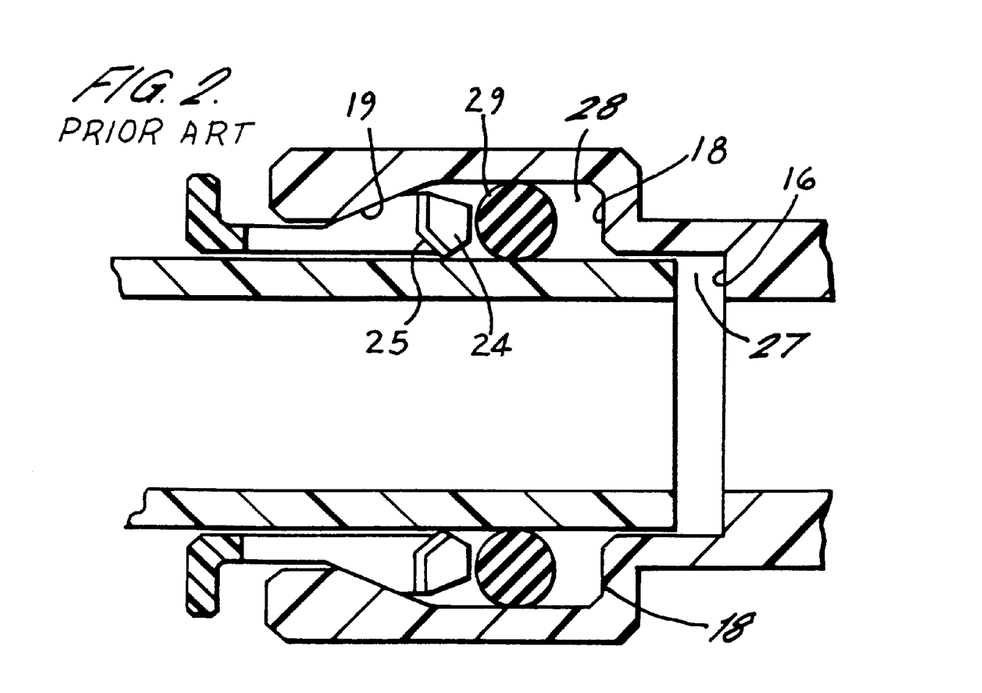
FIG. 2 is a sectional view through the coupling of FIG. 1 showing the collet and tube retracted slightly to engage the gripping action of the collet on the tube.

As shown in FIG. 2, teeth or barbs 25 on the heads 24 of the collet have an initial grip with the surface of the tube so that when the tube is retracted slightly after insertion into the coupling body either manually or as a result of fluid pressure within the tube/throughway, the heads 24 of the collet are drawn into engagement with the tapered cam surface 19 which compresses the heads against the surface of the tube to provide a gripping action with the tube sufficient to prevent the tube from being extracted from the coupling body. As a result of the slight retraction of the tube, a small gap 27 is formed between the end of the tube and step 16 and there is also a void 28 between the seal 26 and step 18 in which fluids/solids can be trapped and "go off" if allowed to.

In accordance with the present invention, a hard plastics sleeve 30 shown in FIGS. 3–6 is force fit in the end of the tube 11 and has a portion 31 which projects into the throughway 13 to bridge across the step 16 between the tube and sleeve. The sleeve 30 has at least one annular barb cross section projection 32 on its outer surface shaped to hold the sleeve in the tube after insertion of the sleeve in the tube. The sleeve is formed with an outwardly projecting integral annular flange 34 which abuts the end of the tube to engage between the tube and step 16 and to ensure that the portion 31 of the sleeve which engages in the throughway is sufficiently long to remain in engagement with the throughway even after the tube and sleeve have retracted slightly to engage the gripping action of the collet as described above.

Figure 3:
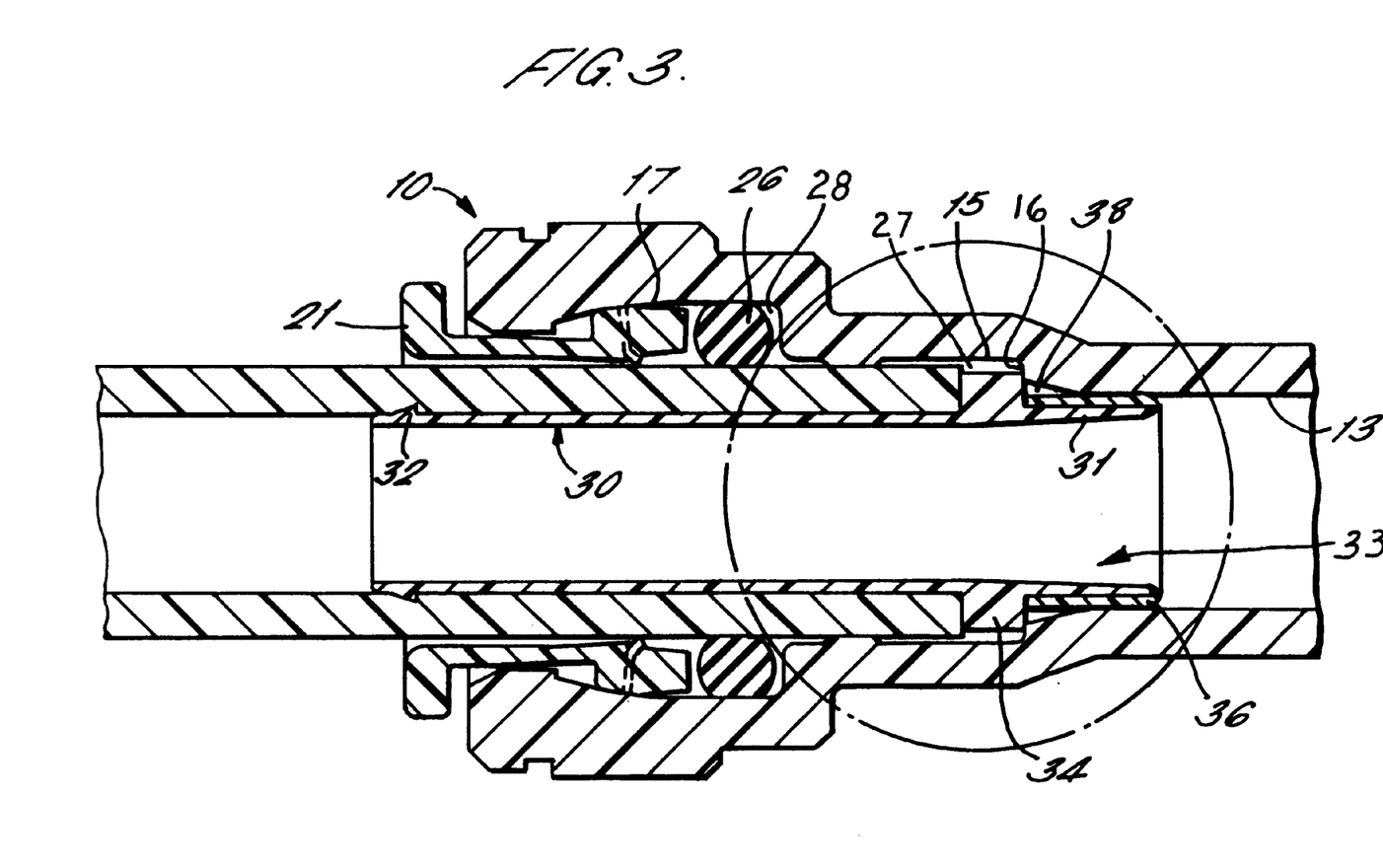
FIG. 3 is a similar view to FIG. 1 embodying a sealing sleeve to isolate potential bug traps from the throughway.
Figure 4:
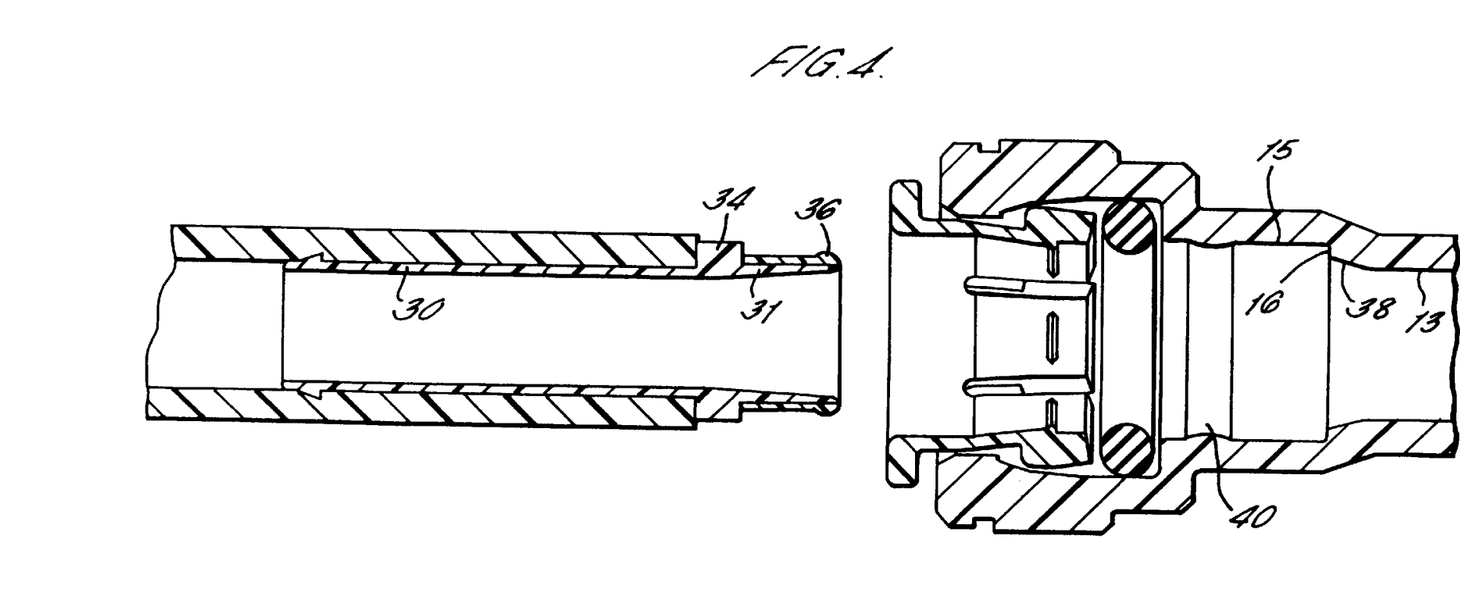
FIG. 4 is a similar view to FIG. 3 showing the tube before engagement in the coupling body.
Figure 5:
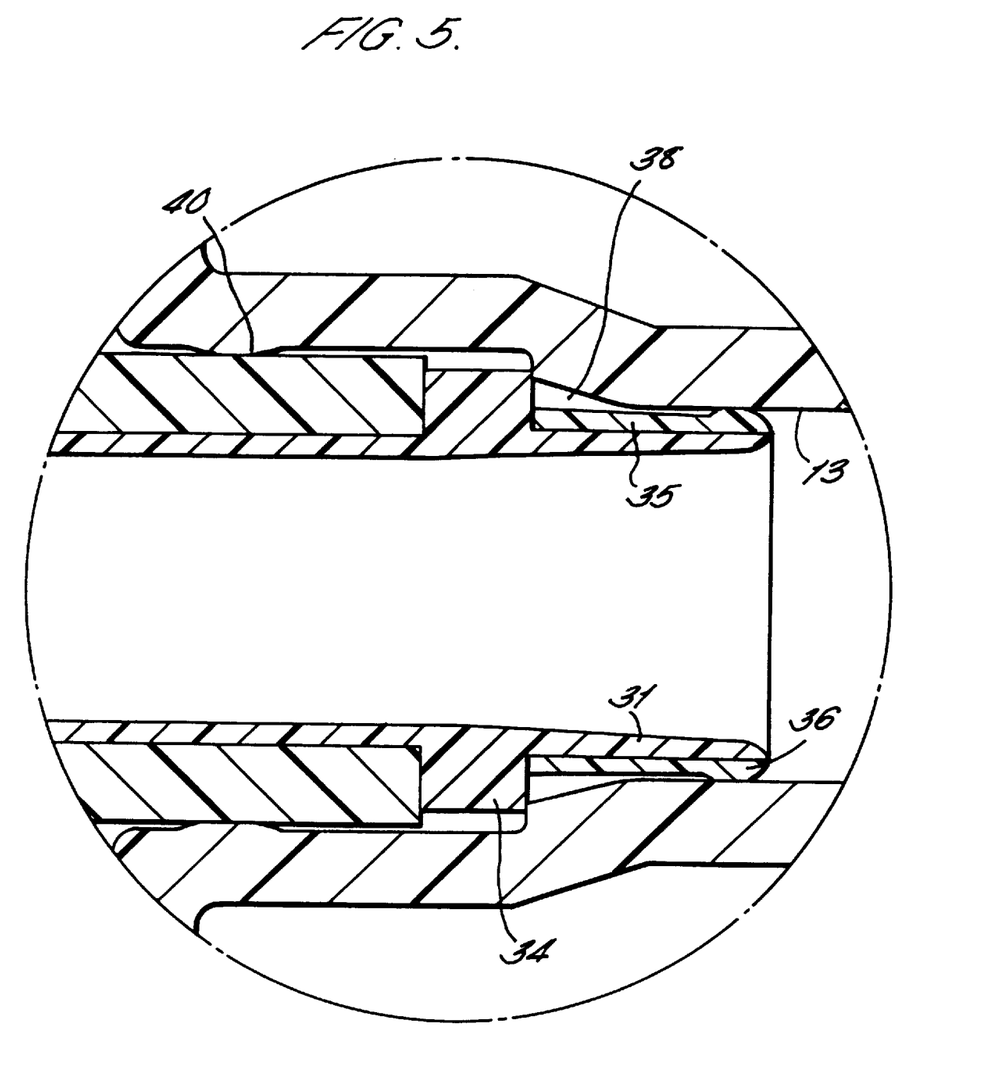
FIG. 5 is an enlarged view of the encircled region of the coupling body of FIG. 3.

The portion 31 of the sleeve has an encircling collar 35 extending between the flange 34 and end of the sleeve which is extruded onto the sleeve and is formed from a relatively soft plastics material which self-adheres to the sleeve. The collar has an upstanding integral annular sealing ring 36 at the end of the sleeve to engage and seal with the throughway of the coupling body.

Alternatively, the collar may be secured mechanically to the sleeve, for example by windows in the collar to receive abutments on the sleeve or by annular recesses in the sleeve on which the collar engages.

The sealing ring 36 of the collar engages the inner surface of the throughway 13 to prevent penetration of fluids between the sleeve and throughway. The compliance of the relatively soft plastics material of the sealing ring enables the ring to accommodate minor imperfections in the shape and surface finish of the throughway to ensure as perfect a seal with the throughway as possible.

The end of the throughway 13 adjacent the step 16 is formed with a tapered section 38 to provide a "lead in" for the collar and sealing ring as the tube is inserted into the coupling body.

It will be appreciated that when the tube 11 and sleeve 30 have retracted slightly to engage the gripping action of the collet with the tapered cam surface in the coupling body, the sleeve slides with the tube partially out of the throughway 13 but leaves an end portion 33 of the sleeve with the annular sealing ring 36 still in effective sealing engagement with the throughway to prevent entry of fluids into the voids 27 and 28 around the tube. Thus a smooth continuous surface is preserved between the tube and throughway with no gaps or voids where fluids may accumulate.

The enlarged diameter portion 15 of the throughway of the coupling body has a raised encircling abutment 40 which bears on the center surface of the tube 11 to provide a further seal with the tube.

The length of the sleeve 30 within the tube 11 is chosen so that the end of the sleeve in the tube is visible from outside the coupling body if transparent or translucent tube materials are used so that the location of the end of the sleeve can be used to judge whether the end of the tube has been fully inserted in the coupling body or not.

Figure 6:
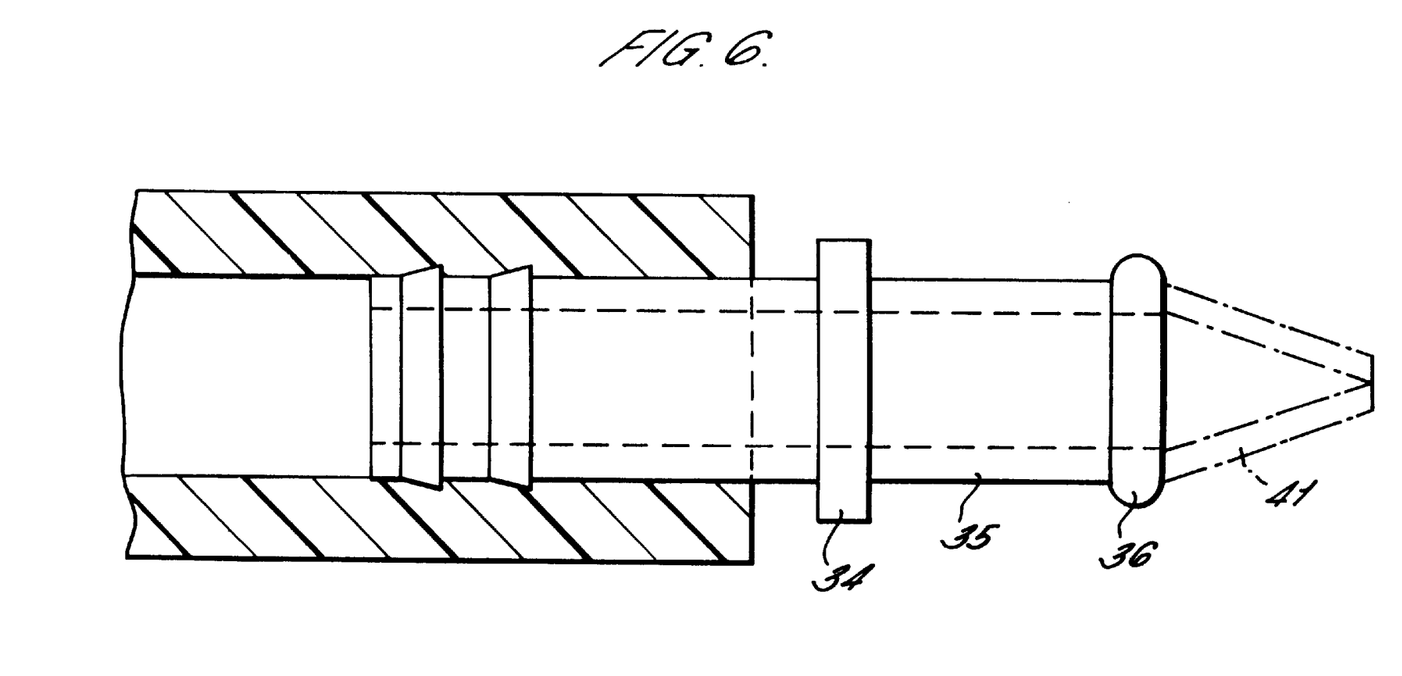
FIG. 6 is a diagrammatic view of a modified form of the sealing collar to provide a non-return valve.
Figure 7:
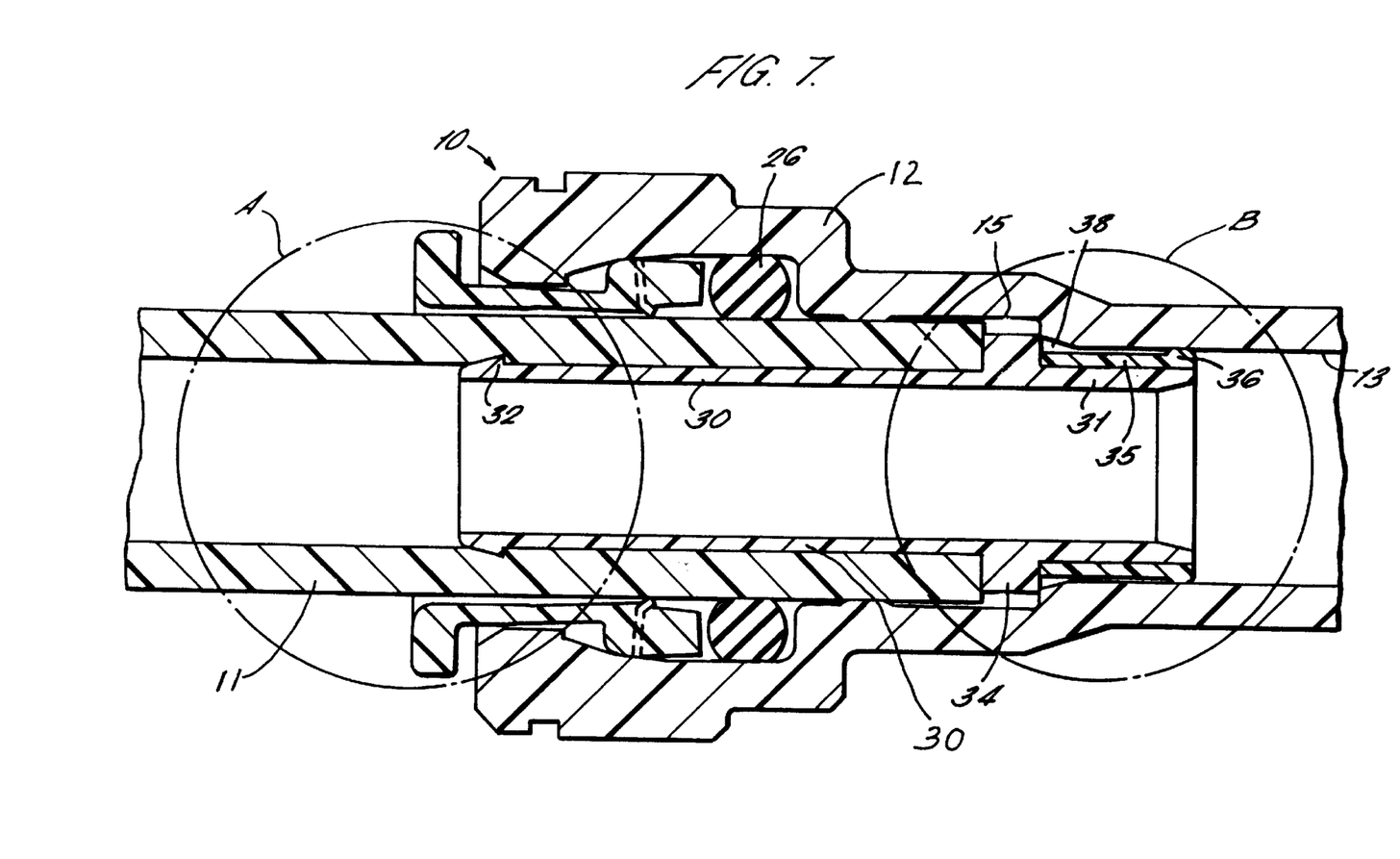
FIG. 7 is a similar view to FIG. 3 above embodying a sealing sleeve to isolate potential bug traps from the throughway of the coupling.
Figure 8:
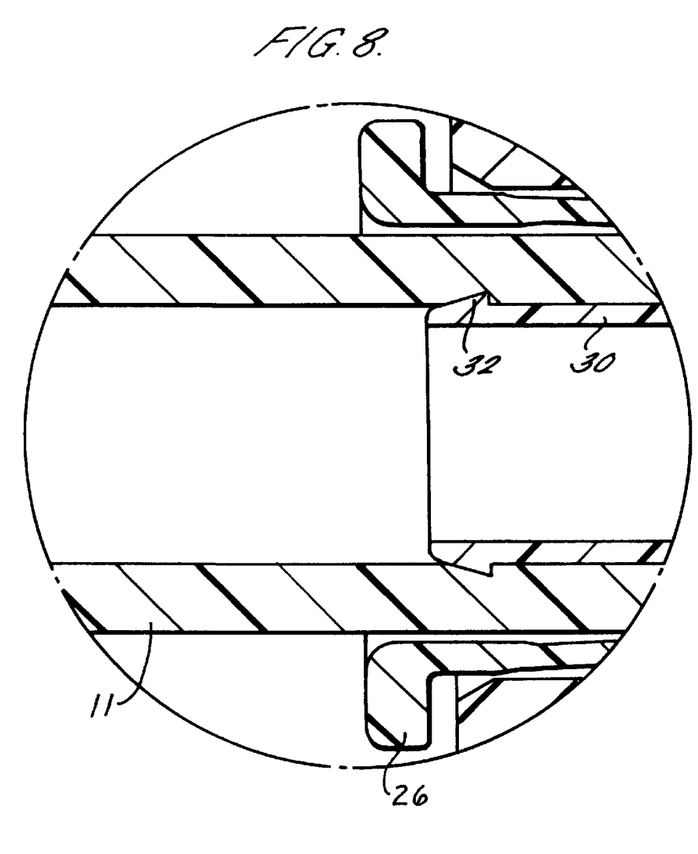
FIG. 8 is an enlarged detail view of the part of the coupling encircled at (a) on FIG. 7.
Figure 9:
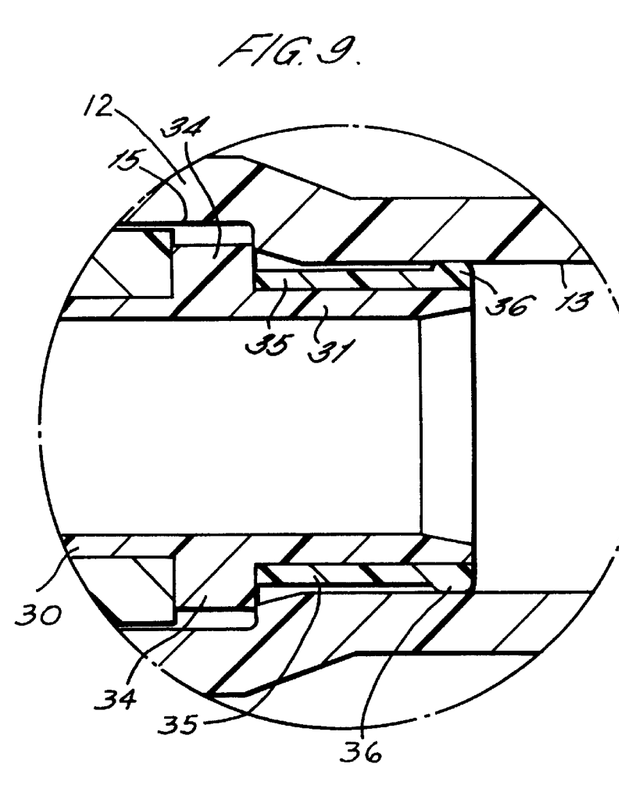
FIG. 9 is an enlarged detail view of the part of the coupling of FIG. 7 encircled at (e)

FIG. 6 of the drawings shows a modified arrangement in which the collar has an integral "ducks bill" shaped non-return valve 41 projecting from the collar beyond the end of the sleeve to provide a non-return valve in the tube coupling.

The various arrangements shown in FIGS. 7 to 13 of the drawings are similar to those described and like parts have been allotted the same reference numerals.

Figure 10:
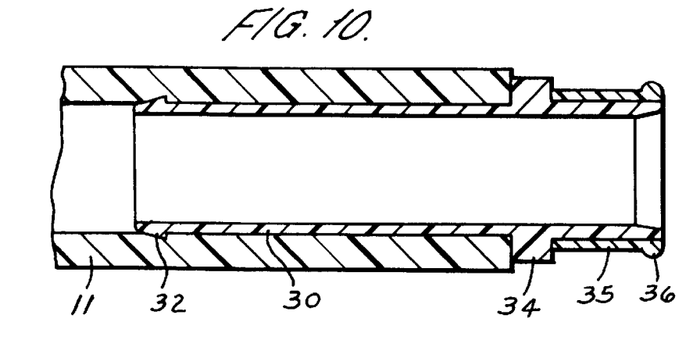
FIG. 10 is a detail view of the sealing sleeve prior to insertion in the tube.
Figure 11:
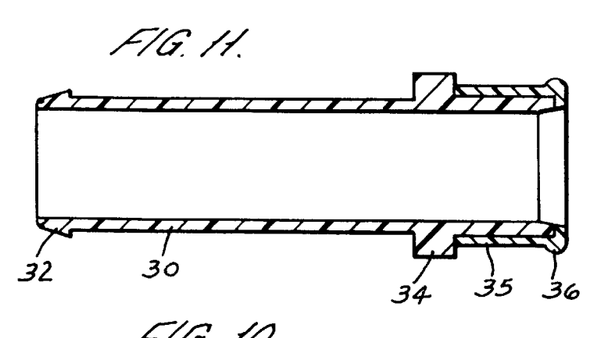
FIG. 11 is a detail view of the sealing sleeve inserted in a tube.

In FIG. 10, the collar 35 is adhered to the sleeve as described in our previous application. In FIG. 11, the end of the collar is turned over the end of the sleeve and is adhered thereto.

Figure 12:
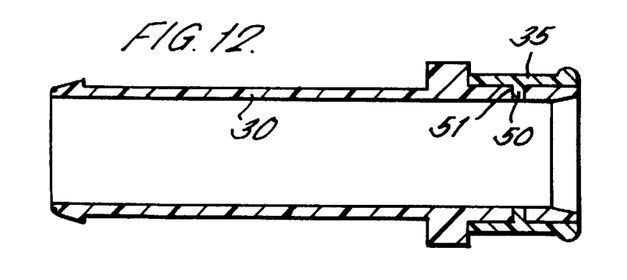
FIG. 12 is a detail view of a modified form of the sealing sleeve.
Figure 13:
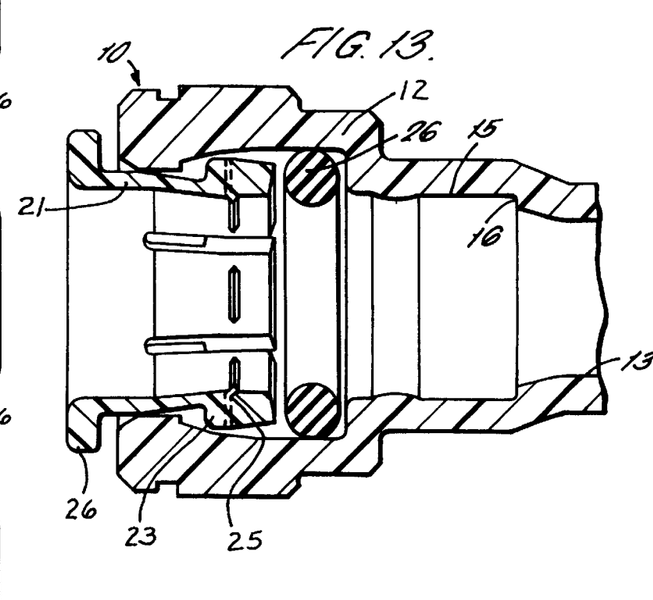
FIG. 13 is a detail view of the coupling body prior to insertion of the tubes.

In FIG. 12, an inwardly projecting abutment or abutments 50 are provided on the inner periphery of the collar 35 which engage in an aperture or apertures 51 in the sleeve 30 to reinforce the location of the collar on the sleeve as shown in FIG. 12 of the drawings. The arrangements are otherwise as disclosed above.

What is claimed is:

1. A tube coupling comprising:

a coupling body having a throughway with an open end to receive a tube, the diameter of the throughway increasing towards said open end at a first location to form a first enlarged diameter portion to receive the tube, and at a second location to form a second, further enlarged diameter portion to receive a locking device to hold the tube in the coupling body; and a relatively hard plastics sleeve with a first end portion force fit in the tube to be engaged in the coupling, and a second end portion having an integral collar formed from a relatively soft plastics material with an integral upstanding annular sealing abutment to engage sealingly in the throughway of the coupling body beyond said first location to prevent ingress of fluids between the sleeve and the throughway.

2. A tube coupling as claimed in claim 1, wherein the sleeve has an integral annular flange spaced from said second end portion, and said collar encircles the sleeve between the flange and said second end portion.

3. A tube coupling as claimed in claim 1, wherein the collar is extruded on to the sleeve and is formed from a plastics material which self-adheres to the plastics of the sleeve.

4. A tube coupling as claimed in claim 1, wherein said first end portion is formed with an integral annular barb encircling the sleeve to engage in the tube and retain the sleeve in the tube so that when the tube moves slightly outwardly of the coupling body the second end portion projecting into the throughway is withdrawn by a corresponding amount, the sealed abutment remaining in sealing engagement with the throughway.

5. A tube coupling as claimed in claim 4, wherein the sleeve has two encircling barbs in spaced locations along the sleeve to engage the tube.

6. A tube coupling as claimed in claim 1, wherein the tube locking device comprises a collet having an annular portion and a plurality of resilient fingers projecting into the coupling body, and the coupling body has a tapered internal cam surface, said cam surface reducing in diameter towards the open end, the fingers of the collet engageable with said cam surface to be compressed against the tube to lock the tube in the coupling body.

7. A tube coupling as claimed in claim 1, wherein the collar is formed with a non-return valve projecting beyond the end of the sleeve.

8. A tube coupling as claimed in claim 1, wherein the tube locking device is a collet device.

* * * * *